United States Patent [19]

Hasegawa et al.

[11] 4,416,601
[45] Nov. 22, 1983

[54] CONTINUOUS VULCANIZER

[75] Inventors: Masakazu Hasegawa, Tokyo; Michio Takaoka, Chiba; Hiroto Oshima, Oimachi; Keiichiro Kataoka, Urawa, all of Japan

[73] Assignee: Fujikura Cable Works, Ltd., Japan

[21] Appl. No.: 322,764

[22] Filed: Nov. 19, 1981

[30] Foreign Application Priority Data

Jun. 10, 1981 [JP] Japan ................................ 56-89358

[51] Int. Cl.³ ............................................. B29H 5/28
[52] U.S. Cl. ..................................... 425/68; 264/236;
264/347; 425/71; 425/114; 425/140; 425/384; 425/445
[58] Field of Search ................... 425/114, 113, 71, 68, 425/445, 384, 140; 264/236, 347, 40.7

[56] References Cited

U.S. PATENT DOCUMENTS

| | | | |
|---|---|---|---|
| 1,689,205 | 10/1928 | Lamplough | 264/236 |
| 3,497,913 | 3/1970 | Gallant | 425/71 |
| 3,588,954 | 6/1971 | Nakamura et al. | 425/445 |
| 3,868,436 | 2/1975 | Ootsuji et al. | 264/236 |
| 3,986,477 | 10/1976 | Bigland | 425/113 |
| 4,029,450 | 6/1977 | Caser | 425/71 |
| 4,080,131 | 3/1978 | Bahder et al. | 425/113 |
| 4,155,695 | 5/1979 | Karppo et al. | 425/445 |
| 4,179,256 | 12/1979 | Tomioka et al. | 425/71 |
| 4,247,271 | 1/1981 | Yonekura et al. | 425/71 |
| 4,247,280 | 1/1981 | Sarracino | 425/445 |

FOREIGN PATENT DOCUMENTS

| | | | |
|---|---|---|---|
| 2431521 | 1/1976 | Fed. Rep. of Germany | 425/113 |
| 2603809 | 8/1977 | Fed. Rep. of Germany | 264/236 |
| 3013556 | 10/1980 | Fed. Rep. of Germany | 264/236 |
| 54-60383 | 5/1979 | Japan | 264/236 |
| 515114 | 12/1971 | Switzerland | 425/71 |

Primary Examiner—Jeffery R. Thurlow
Attorney, Agent, or Firm—Kane, Dalsimer, Kane, Sullivan and Kurucz

[57] ABSTRACT

Apparatus for continuously vulcanizing a covered material on a conductor comprises a feed device for feeding the conductor in one direction at a constant speed and an extruder for applying the covered material to the conductor fed from the feed means. A vulcanizing tube extends from the extruder, the cable passing through the vulcanizing tube. The vulcanizing tube has a curing section extending from its inlet to a location intermediate its inlet and outlet. A take-off device is disposed forwardly of the vulcanizing tube for hauling the cable. A load applying device is disposed between the extruder and the take-off device for applying a load to the traveling cable at a location forwardly of the curing section of the vulcanizing tube, so that a tension exerted on the cable in a direction opposite to the direction of travel of the cable is applied to the traveling cable.

4 Claims, 7 Drawing Figures

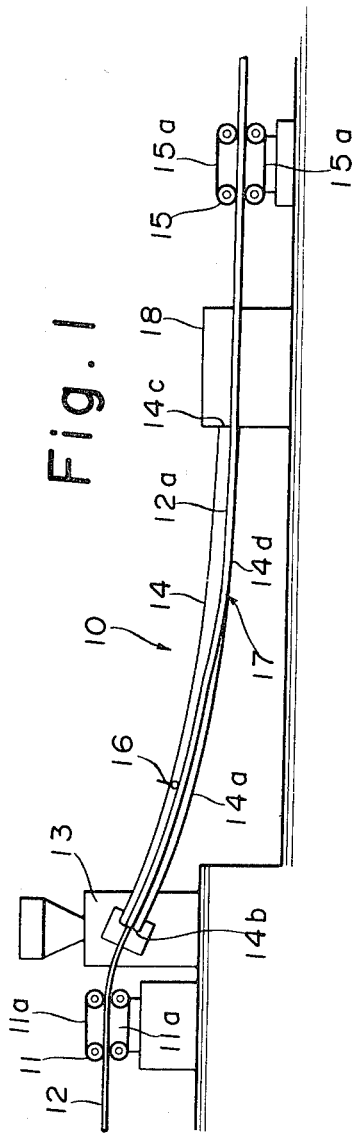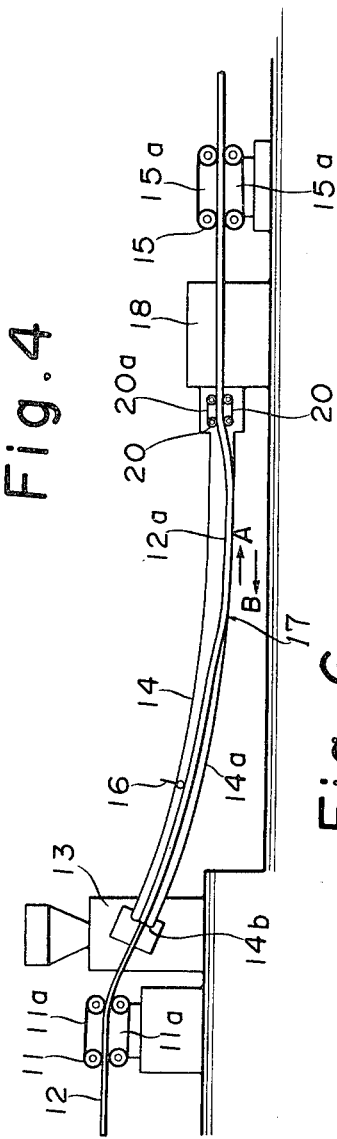

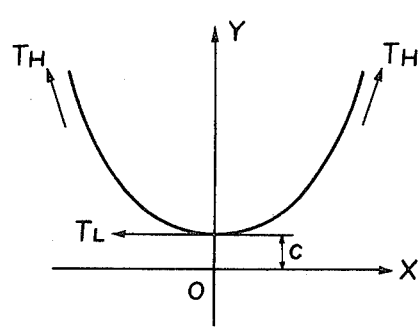
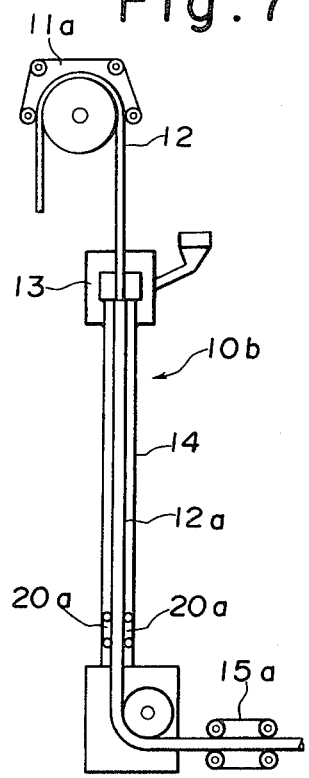
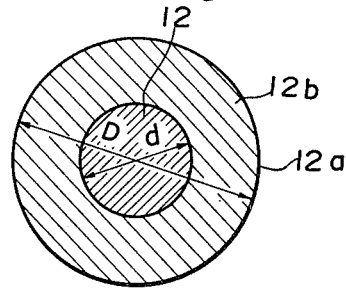
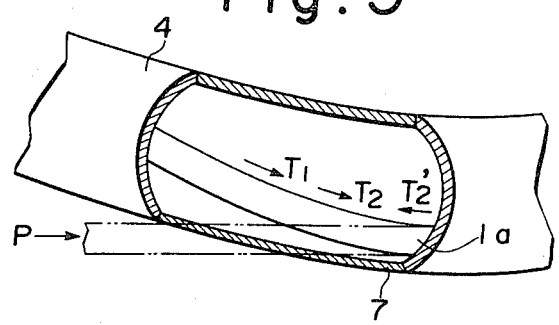

CONTINUOUS VULCANIZER

BACKGROUND OF THE INVENTION

1. Field of the Invention

This invention relates generally to an apparatus for continuously curing a heat curable polymeric covering on an elongated conductor and particularly to such an apparatus of the catenary type.

2. Prior Art

One conventional vulcanizer of the catenary type, designated generally at 10 in FIG. 1, comprises metering catapillars 11 for feeding a conductor 12 in one direction at a constant speed, an extruder 13 for applying a covering material on the conductor 12 fed from the metering catapillars 11, a vulcanizing tube 14 for passing the cable 12a therethrough, and tensioning catapillars 15 for hauling the cable 12a. The vulcanizing tube 14 has a curing section 14a arranged in the form of a catenary and extending from its inlet 14b to a location intermediate its inlet 14b and outlet 14c. The curing section 14a is filled with a hot curing medium under pressure. Thus, the covering material on the conductor 12 is cured during the passage of the cable 12a through the curing section 14a. A positioning sensor 16 is provided in the curing section 14a of the vulcanizing tube 14 for sensing the position of the cable 12a in the curing section 14a. A signal is fed from the positioning sensor 16 to the tensioning catapillars 15 through a control circuit so that the speed of rotation of the tensioning catapillars 15 is electrically controlled to impat a required tension to the cable 12a, thereby maintaining the cable 12a in the form of a catenary in the curing section 14a. Therefore, the cable 12a is always kept away from the internal wall of the vulcanizing tube so that the uncured covering material is prevented from being deformed. The covering material on the conductor 12 is cured during the passage thereof through the vulcanizing tube 14. The cable 12a is moved in sliding contact with the bottom of the internal wall of the vulcanizing tube 14 after it passes a touch down point 17. The covering material has been completely cured before the cable 12a reaches the touch down point 17. The vulcanizing tube 14 also comprises a cooling section 14d disposed forwardly of the curing section 14a, a cooling medium being filled in the cooling section for cooling the cable 12a passing therethrough. An end seal box 18 is attached to the outlet 14c of the vulcanizing tube 14 to protect against the leakage of a medium. The cable 12a passes through the end seal box 18 and gripped by the opposed tensioning catapillars 15.

The catenary of the cable 12a is defined by the following formula:

$$C(cm) = T_L/W$$

Wherein C is a catenary factor, W(Kg/cm) is a unit weight of the cable 12a, and $T_L$ is a lower (horizontal) tension.

Also, the catenary of the cable 12a is indicated in coordinates in FIG. 2, and the following formula is obtained:

$$Y = C \cos hx/c$$

Therefore, in order to make the catenary factor C constant (for example, the distance between the cable 12a and the internal wall of the vulcanizing tube 14), the lower tension $T_L$ and an upper tension $T_H$ must be made constant because the unit weight W is constant.

As described above, the covering material on the conductor 12 is completely cured at a location adjacent to the touch down point 17, so that the solidified covering 12b is formed on the conductor 12 in concentric relation thereto, as shown in FIG. 3. A pressure $P(kg/cm^2)$ of the hot curing medium in the vulcanizing tube 14 is exerted on the covering 12b of the cable 12 so that a tension $T_2(kg)$ is applied to the cable 12a in the direction of movement thereof.

The tension $T_2$ is obtained from the following formula:

$$T_2 = \pi/4 D^2 P$$

Wherein D is an outer diameter of the cable 12a.

In the case where the curing medium has a relatively large specific gravity, the curing medium imparts a considerable buoyancy to the cable 12a. As a result, the apparent weight W of the cable 12a becomes lighter, and the upper tension $T_H$ and the lower tension $T_L$ has to become less because the catenary factor C is constant in the vulcanizing tube 14. $T_L$ is obtained from the following formula:

$$T_L = T_1 + T_2$$

The tension $T_1$ can be reduced by controlling the speed of rotation of the tensioning catapillers 15a, 15a. As described above, the tension $T_2$ is determined by the pressure P exerted by the pressurized curing medium on the cable 12a. Therefore, if the pressure P is reduced below a predetermined level so as to reduce the tension $T_2$ to maintain a desired catenary, the covering material on the conductor 12 is foamed because the pressure compressing the covering material is reduced, and the electrical characteristics of the cable 12a is adversely affected.

In a conventional vulcanizer of the vertical type, a tension $T_2(kg)$, exerted on the cable 12a in the direction of movement thereof by a pressure $P(kg/cm^2)$ of a pressurized hot curing medium in a vertical vulcanizing tube, is obtained from the following formula:

$$T_2 = \pi/4(D^2 - d^2)P$$

wherein d is an outer diameter of the conductor 12 and D is an outer diameter of the cable 12a. With this vulcanizer of the vertical type, the tension $T_2$ has no effect on the position of the cable in the vulcanizing tube but has effect on the gripping force of the metering catapillars. Therefore, if the pressure P of the hot curing medium is increased, the gripping force of the metering catapillars must correspondingly be increased. Thus, the metering catapillars becomes bulky to meet such requirements, and the overall construction cost of the vulcanizing apparatus becomes more expensive.

SUMMARY OF THE INVENTION

With the above deficiencies of the prior art in view, it is therefore an object of this invention to provide a vulcanizer of the type having means whereby a tension, exerted on a cable by a pressure of a curing medium, is reduced or cancelled.

Another object is to provide a vulcanizer of the catenary type in which the cable is maintained in the form of a catenary in a vulcanizing tube irrespective of the pressure of the curing medium.

According to the present invention, there is provided an apparatus for continuously vulcanizing a covering material on a conductor which comprises a feed means for feeding the conductor in one direction at a constant speed; an extruder for applying the covering material onto the conductor delivered from said feed means to form a cable; a vulcanizing tube extending from said extruder, said cable passing through said vulcanizing tube, said vulcanizing tube having a curing section extending from its inlet to a location intermediate its inlet and outlet; a take-off means disposed forwardly of said vulcanizing tube for hauling the cable in such a manner that the cable is delivered along a predetermined path in said vulcanizing tube, the cable being kept away from the internal wall of said vulcanizing tube over said curing section; a load applying means disposed between said extruder and said take-off means for applying a load to the traveling cable at a location forwardly of said curing section of said vulcanizing tube, so that a tension exerted in a direction opposite to the direction of travel of the cable is applied to the traveling cable.

BRIEF DESCRIPTION OF THE DRAWINGS

FIG. 1 is a schematic side elevational view of a vulcanizing apparatus of the catenary type provided in accordance with the prior art:

FIG. 2 is coordinates showing a catenary of a cable;

FIG. 3 is a cross-sectional view of a cable;

FIG. 4 is a schematic side elevational view of a vulcanizing apparatus of the catenary type provided in accordance with the present invention;

FIG. 5 is a fragmentary view of a vulcanizing tube;

FIG. 6 is a fragmentary view of a modified vulcanizer; and

FIG. 7 is an elevational view of a vulcanizer of the vertical type provided in accordance with the present invention.

DESCRIPTION OF THE PREFERRED EMBODIMENTS

FIG. 4 shows a vulcanizer 10a of the catenary type which comprises a feed means 11 in the form of opposed metering catapillars 11a, 11a for feeding a conductor 12 in one direction at a constant speed, an extruder 13 for applying a covering material to the conductor 12 fed from the feed means 11, a vulcanizing tube 14 for passing the cable 12a therethrough, and a take-off means 15 in the form of opposed tensioning catapillars 15a, 15a for hauling the cable 12a. The vulcanizing tube 14 has a curing section 14a arranged in the form of a catenary and extending from its inlet 14b to a location intermediate its inlet 14b and outlet 14c. The vulcanizing apparatus 10a of the present invention differs from the vulcanizing apparatus 10 of FIG. 1 only in that a load applying means 20 is provided.

The load applying means 20 comprises a pair of opposed loading catapillars 20a, 20a arranged in the vulcanizing tube 14 and disposed at a location intermediate a touch down point 17 and an end seal box 18. The loading catapillars 20a, 20a grip the cable 12a passing therethrough. The loading catapillars 20a, 20a are not connected to a drive means and are held against the traveling cable 12a so that the loading catapillars 20a, 20a are driven for rotation by the cable 12a. Thus, the loading catapillars 20a, 20a serve to impart a load to the cable 12a passing therebetween. Although not shown in the drawings, the loading catapillars 20a, 20a has a brake means for controlling the force required for rotating the loading catapillars 20a, 20a so that the load applied to the cable 12a by the loading catapillars 20a, 20a is adjusted.

As shown in FIG. 5, in the vicinity of the touch down point 17, the pressure P of the curing medium in the vulcanizing tube 14 is exerted on the solidified covering material on the conductor 12 so that the tension $T_2$ is applied to the cable 12a in the direction of travel thereof indicated by the arrow A (FIG. 4). The cable 12a is gripped by the loading catapillars 20a, 20a at a location forwardly of the touch down point 17 so that a tension $T_2'$ is applied to the cable 12a in a direction (indicated by an arrow B) opposite to the direction of movement of the cable 12a. As a result, the tension $T_2$ is either cancelled or reduced by the tension $T_2'$. With this arrangement, irrespective of the pressure P, the cable 12a is maintained in the form of a catenary in the vulcanizing tube 14 by the tensioning catapillars 15a, 15a, the speed of rotation of which is controlled through the positioning sensor 16. As described above, the positioning sensor 16 detects the position of the cable relative to the internal wall of the vulcanizing tube 14 and sends a signal to the tensioning catapillars 15a, 15a through a control circuit so that the speed of rotation of the tensioning catapillars 15a, 15a is electrically controlled to impart the tension $T_1$ to the cable 12a to maintain the lower tension $T_L$ of the cable at a constant level. Therefore, the cable 12a is maintained in the form of a catenary in the vulcanizing tube 14 so that the cable 12a is always kept away from the internal wall of the vulcanizing tube 14, thereby preventing the uncured covering material on the conductor 12 from being deformed by contact with the internal wall.

As shown in FIG. 6, the loading catapillars 20a, 20a may be arranged between the end seal box 18 and the tensioning catapillars 15a, 15a.

FIG. 7 shows a vulcanizer 10b of the vertical type which comprises a linear vulcanizing tube 14 disposed vertically. The loading catapillars 20a, 20a are arranged in the vulcanizing tube adjacent to the end seal box 18. The loading catapillars 20a, 20a may be arranged between the end seal box 18 and the tensioning catapillars 15a, 15a. Since the cable 12a is gripped by the loading catapillars 20a, 20a, the metering catapillars 11a, 11a does not need to provide an unduly great gripping force for gripping the conductor 12 even when the pressure P of the curing medium in the vulcanizing tube 14 is increased. Therefore, the metering catapillars 11a, 11a can be constructed in a relatively compact manner, and besides a structure supporting the metering catapillars does not need to have an excessively increased strength. As a result, the vulcanizing apparatus 10b of the vertical type can be constructed at low costs.

As described above, by virtue of the provision of the loading catapillars 20a, 20a, the tension is applied to the cable in the direction opposite to the direction of movement of the cable so that the tension, exerted on the cable by the pressure of the curing medium in the direction of movement of the cable, is either cancelled or reduced.

What is claimed is:

1. A continuous vulcanizer for continuously curing a covering material on a conductor which comprises:
(a) a feed means for feeding the conductor in one direction at a constant speed;

(b) an extruder for applying the covering material to the conductor delivered from said feed means to form a cable;

(c) a vulcanizing tube extending from said extruder, the cable passing through said vulcanizing tube, said vulcanizing tube having a catenary-shaped curing section extending from its inlet to a location intermediate to its inlet and outlet, and said curing section being filled with a pressurized curing medium;

(d) a take-off means disposed forwardly of said vulcanizing tube for hauling the cable in such a manner that the cable is delivered along a predetermined path in said vulcanizing tube, the cable being kept away from the internal wall of said vulcanizing tube over said catenary-shaped curing section;

(e) a positioning sensor arranged in said vulcanizing tube for sensing the position of the cable relative to the internal wall of said vulcanizing tube, said take-off means being controlled through said positioning sensor; and (f) a load applying means disposed between said extruder and said take-off means for applying a load to the travelling cable at a location forwardly of said curing section of said vulcanizing tube and comprising a pair of opposed rotational members held against and gripping the cable and a brake means for controlling a force necessary to rotate said opposed rotational members, so that a tension exerted on the cable in a direction opposite to the direction of travel of the cable is applied to the traveling cable, thereby cancelling a tension exerted by the pressure of said curing medium on the cable in a direction of travel of the cable so as to maintain the cable in said curing section in a predetermined catenary shape.

2. A continuous vulcanizer according to claim 1, in which said load applying means is arranged in said vulcanizing tube at a location forwardly of said curing section.

3. A continuous vulcanizer according to claim 1, in which said load applying means is arranged between said vulcanizing tube and said take-off means.

4. A continuous vulcanizer according to any one of claims 1 to 3, in which said load applying means comprises a pair of opposed loading catapillars for gripping the cable passing therethrough, said loading catapillars being driven for rotation by the cable passing therethrough.

* * * * *